(12) United States Patent
Yanagihara

(10) Patent No.: US 11,161,504 B2
(45) Date of Patent: Nov. 2, 2021

(54) VEHICLE CONTROL APPARATUS AND METHOD

(71) Applicant: Honda Motor Co.,Ltd., Tokyo (JP)

(72) Inventor: Suguru Yanagihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 294 days.

(21) Appl. No.: 16/357,347

(22) Filed: Mar. 19, 2019

(65) Prior Publication Data

US 2020/0298848 A1    Sep. 24, 2020

(51) Int. Cl.
*B60W 30/095* (2012.01)
*B60W 40/04* (2006.01)
*G08G 1/16* (2006.01)
*B60W 20/12* (2016.01)

(52) U.S. Cl.
CPC ........ *B60W 30/0956* (2013.01); *B60W 20/12* (2016.01); *B60W 40/04* (2013.01); *G08G 1/166* (2013.01); *G08G 1/167* (2013.01)

(58) Field of Classification Search
CPC ........ G06K 9/00798; B60W 30/18154; B60W 30/18159; B60W 30/18163; B60W 30/0956; G08G 1/162; G08G 1/163; G08G 1/166; G08G 1/167; G01C 21/3658; B62D 15/0255
See application file for complete search history.

(56) References Cited

U.S. PATENT DOCUMENTS

| | | | |
|---|---|---|---|
| 8,346,426 B1* | 1/2013 | Szybalski | G01C 21/3676 701/28 |
| 9,910,443 B1* | 3/2018 | Lee | B60W 60/0015 |
| 2005/0111120 A1* | 5/2005 | Plaster | G02B 27/0101 359/850 |
| 2009/0326796 A1* | 12/2009 | Prokhorov | G08G 1/166 701/532 |
| 2013/0289824 A1* | 10/2013 | Mudalige | G08G 1/167 701/41 |
| 2017/0217430 A1* | 8/2017 | Sherony | B60Q 9/008 |
| 2017/0236413 A1* | 8/2017 | Takagi | B60W 40/09 701/117 |
| 2018/0074502 A1* | 3/2018 | Holben | B60W 30/18154 |
| 2018/0105174 A1* | 4/2018 | Russell | G05D 1/0088 |
| 2018/0143643 A1* | 5/2018 | Fairfield | G01C 21/20 |
| 2018/0247538 A1* | 8/2018 | Baek | B60W 30/18154 |

(Continued)

FOREIGN PATENT DOCUMENTS

JP    2018045482    3/2018

*Primary Examiner* — Thomas G Black
*Assistant Examiner* — Sara J Lewandroski
(74) *Attorney, Agent, or Firm* — JCIPRNET

(57) ABSTRACT

A vehicle control apparatus and method are provided. The vehicle control apparatus comprises a surrounding detection part, detecting a surrounding status of a host vehicle; and a control part, performing a moving control of the host vehicle according to the surrounding status. In a road system including a first road and a second road intersected with the first road that includes a first lane, a second lane that is an opposite lane of the first lane and a specified area arranged between the first and the second lanes, when the host vehicle enters the first lane, the control part make a determined result whether the host vehicle can enter the specified area or not according to a traffic situation of the second lane, and performs the moving control according to the determined result.

10 Claims, 5 Drawing Sheets

(56) References Cited

U.S. PATENT DOCUMENTS

| | | | |
|---|---|---|---|
| 2019/0018419 A1* | 1/2019 | Lee | G08G 1/163 |
| 2019/0176844 A1* | 6/2019 | Sedlmayr | G08G 1/162 |
| 2019/0202451 A1* | 7/2019 | Hayamizu | G06T 7/70 |
| 2019/0276027 A1* | 9/2019 | Toda | B60W 30/16 |
| 2019/0302768 A1* | 10/2019 | Zhang | B60W 50/14 |
| 2020/0066143 A1* | 2/2020 | Yao | E01C 1/02 |
| 2020/0191970 A1* | 6/2020 | Hou | G01S 17/89 |
| 2020/0192365 A1* | 6/2020 | Russell | G05D 1/0088 |
| 2021/0276554 A1* | 9/2021 | Russell | G08G 1/202 |

* cited by examiner

VEHICLE CONTROL APPARATUS AND METHOD

BACKGROUND

Technical Field

The disclosure relates to a vehicle control apparatus and method for controlling a vehicle to enter a target area from a side road.

Description of Related Art

The related art of Japanese Application Laid Open 2018-045482 discloses a vehicle control method that a detection method is changed based on a position relation between a crossroad and vehicles when the vehicle entering a lane of an intersection.

When entering a crossroad by turning left or right, it is necessary to monitor the left-moving vehicle and the right-moving vehicle in the target lane and the opposite lane of the target lane, and thus the processing burden of the vehicle control apparatus is large. In addition, since the consideration of the traffic situation of two opposite lanes will spend a lot time, the time for waiting to turn left or right becomes longer.

SUMMARY

According to one embodiment of the disclosure, a vehicle control apparatus is provided. The vehicle control apparatus comprises a surrounding detection part, detecting a surrounding status of a host vehicle; and a control part, performing a moving control of the host vehicle according to the surrounding status. In a road system including a first road and a second road intersected with the first road that includes a first lane that is an innermost lane, a second lane that is an opposite lane of the first lane and a specified area arranged between the first and the second lanes, when the host vehicle enters a first lane, the control part make a determined result whether the vehicle can enter the specified area or not according to a traffic situation of the second lane, and performs the moving control according to the determined result.

According to another embodiment of the disclosure, a vehicle control method is provided. The vehicle control method is executed by a control part of a host vehicle, and the method comprises: detecting a surrounding status of the host vehicle; performing a moving control of the host vehicle according to the surrounding status; in a road system including a first road and a second road intersected with the first road that includes a first lane that is an innermost lane, a second lane that is an opposite lane of the first lane and a specified area arranged between the first and the second lanes, when the host vehicle enters a first lane, making a determined result whether the host vehicle is able to enter the specified area or not according to a traffic situation of the second lane; and performing the moving control according to the determined result.

DESCRIPTION OF THE EMBODIMENTS

Embodiment 1

Figure 1:
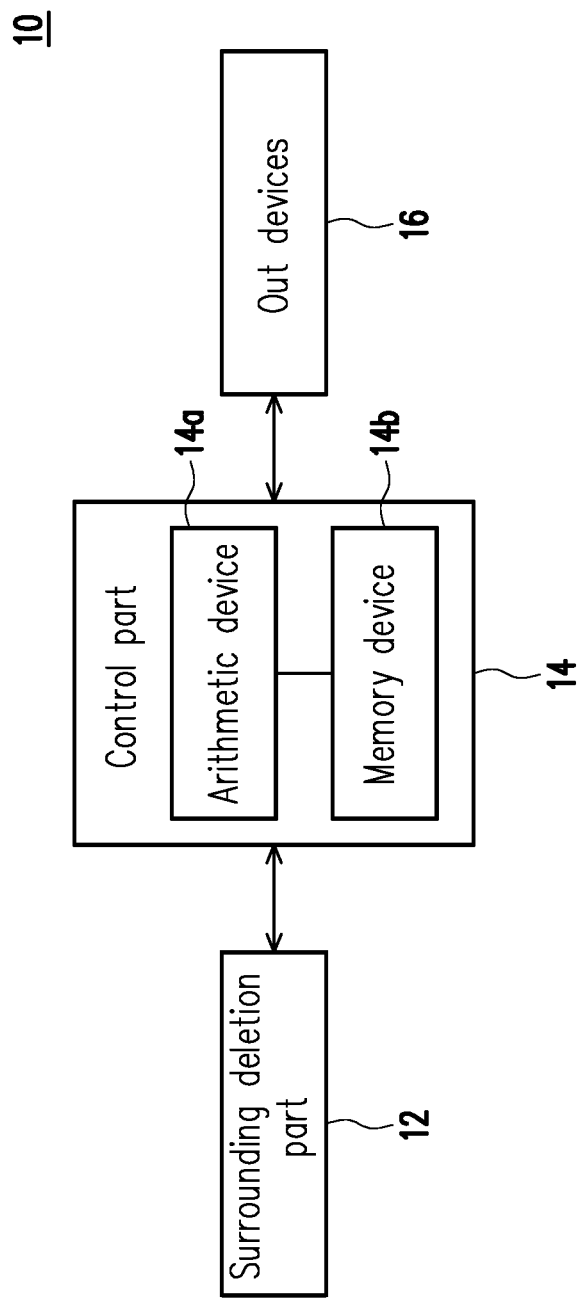
FIG. 1 shows a schematic diagram of a vehicle control apparatus.

FIG. 1 shows a schematic diagram of a vehicle control apparatus. The vehicle control apparatus 10 of a vehicle (not shown) comprises at least a surrounding detection part 12 that detects surrounding status of the vehicle, and a control part 14 for performing a moving control of the vehicle. According to the surrounding status detected by the surrounding detection part 12, the control part 14 of the vehicle may perform various moving control to move the vehicle, such as steering, braking, accelerating, deaccelerating, etc. (also referring to output devices 16). In general, the control part 14 may be constructed by ECU, and include an arithmetic device 14a and a memory device 14b, for example. The memory device 14b may store various threshold values for example for comparison or determination in processing steps in addition to various programs executed by the arithmetic device 14a.

In general, the surrounding detection part 12 may include cameras mounted in the vehicle for capturing surrounding images (such as front images, rear images and side images), radars and LIDARs respectively detecting distances and relative speeds between the surrounding objects (other vehicles or static objects) and the vehicle. The vehicle also may include various sensors for sensing speed, acceleration, decelerating, moving distance, etc. of the vehicle 10. For those skilled in the art, the arrangement of these sensors, detecting components, and the like can be suitably modified based on the requirement. The disclosure only describes the at least required portion for making the description easy.

As known, there are two road system in the world, the right-hand traffic system such as America and the left-hand traffic system such as Japan. In the following embodiment, the right-hand traffic system is used as an example for explaining the disclosure, but not limited thereto. The concept, including the apparatus, the method or the corresponding programs, described in the disclosure can be also applied to the left-hand traffic system with a simple modification.

Figure 2:
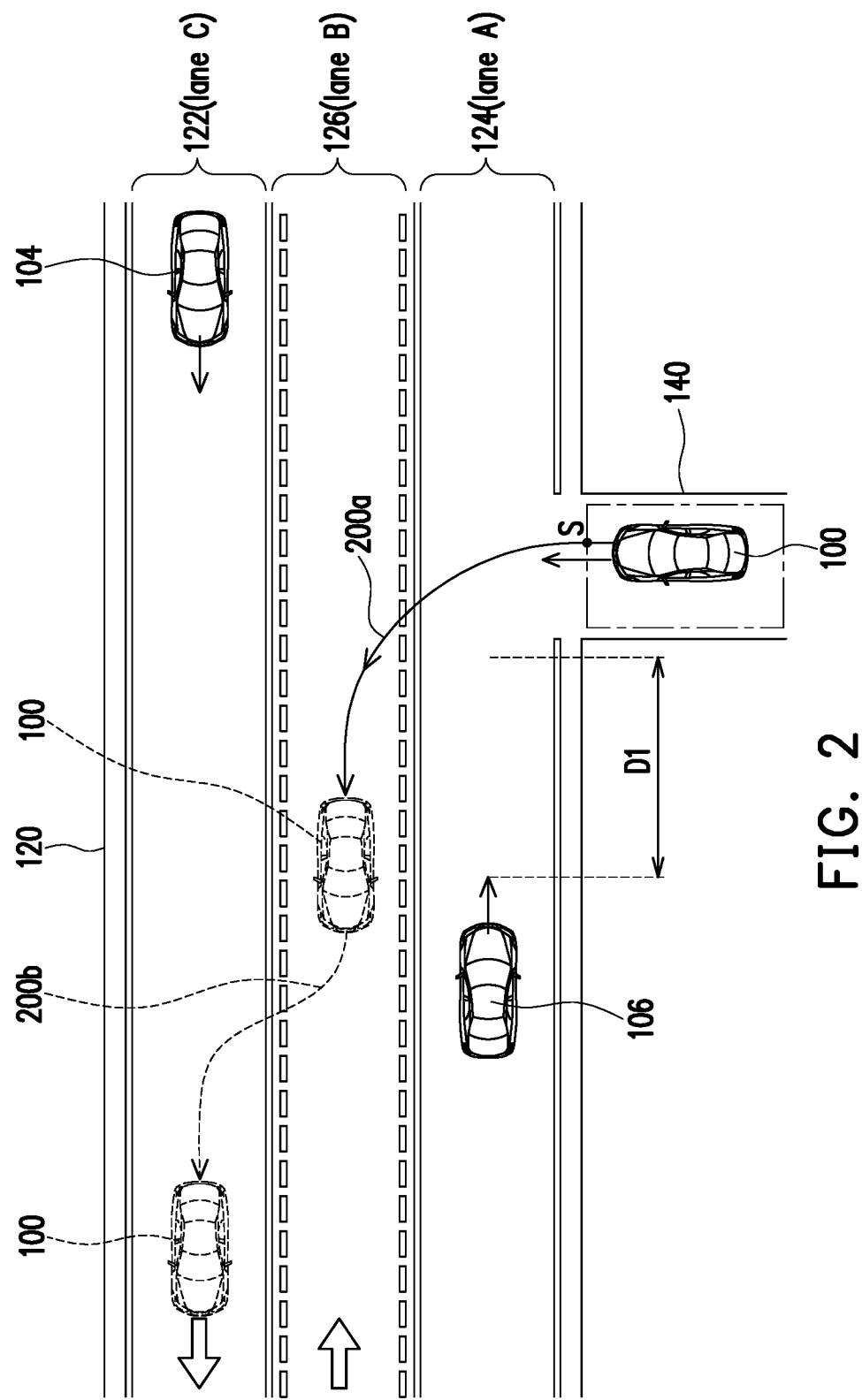
FIG. 2 shows an application scene of a cross road according to the disclosure.

FIG. 2 shows an exemplary scene of a road having a side road according to the disclosure. In FIG. 2, a road 110 includes a first road 120 and a second road 140 that may be a side road or a cross road intersected with the first road 120. The first road 120, which is left-right direction for example in this embodiment, may further include a first lane 122 and a second lane 124 with a moving direction opposite to the first lane 122, i.e., an opposite lane with respect to the first lane 122. In the embodiment, for easy description, the first lane 122, which is the final target lane and located away from the host vehicle 100 at the side road 140, refers to an innermost lane of the first road 110, and the second lane 124, which is in front of the host vehicle 100 at the side road 140, refers to an outermost lane.

Moreover, a specified area 126 is arranged between first lane 122 and the second lane 124. For example, the specified area 126 is a yellow lane, which is usually found in the American road system. The yellow lane 126 is a special lane designed for the vehicle to make a left turn to leave the main road, and the vehicle may only stay in the yellow lane 126 for a predetermined distance or time. According to the disclosure, when the host vehicle 100 tries to make a left turn to enter the first lane 122, the host vehicle 100 is controlled to enter the yellow lane 126 first along the path 200*a* only according to the traffic situation of the second lane 124. Next, the host vehicle 100 is controlled to enter the first lane 122 by performing a lane change along the path 200*b* only according to the traffic situation of the first lane 122. In addition to the yellow lane, other special area, such as a zebra zone that can carry out the disclosure, can be used as the specified area 126.

Figure 3:
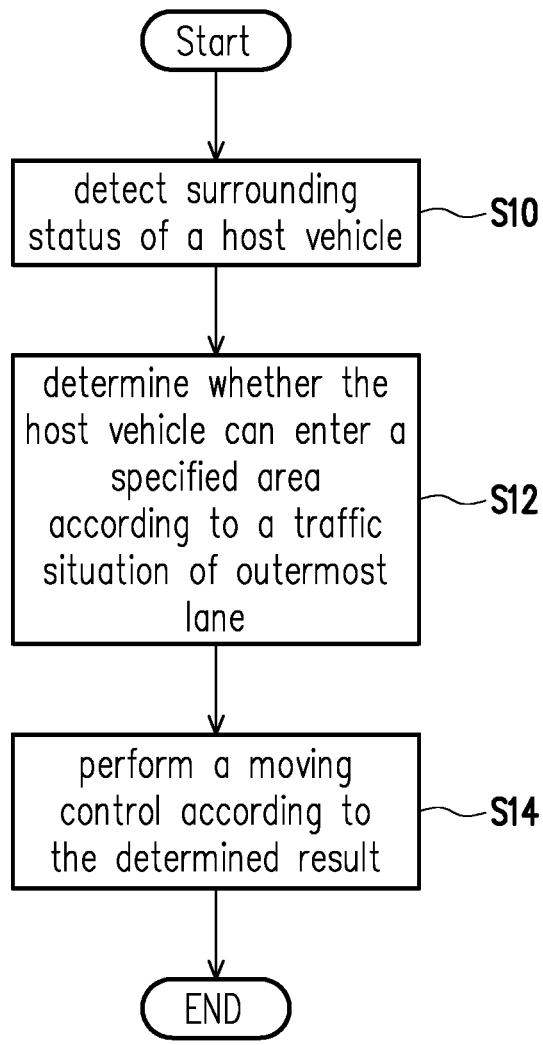
FIG. 3 is an outline flow chart showing a vehicle control method according to the embodiment of the disclosure.

FIG. 3 is an outline flow chart showing a vehicle control method according to the embodiment of the disclosure. The concept of the disclosure is described first according to FIGS. 2 and 3. In addition, the control process is performed on the premise that the specified area 126, i.e., the yellow lane, exists. As shown in FIG. 2, at step S10 of FIG. 3, when the host vehicle 100 prepare to turn left to enter the first lane 122 of the first road 120 from the second road 140 at the start point S, the surrounding detection part 12 of the host vehicle 100 starts detecting a surrounding status of the road 110, including the traffic situation of the first lane 122 and the second lane 124. For example, the surrounding detection part 12 will detect whether the first lane 122 is in a traffic jam or not, and whether there is an oncoming other vehicle 106 in the second lane 124, etc.

At step S12, when the host vehicle 100 arrive the start point S and prepare to make a left turn, the control part 14 of the host vehicle 100 determines whether the host vehicle 100 may cross the first road 110 to enter the specified area 126 only according to a traffic situation of the second lane (i.e., the outermost lane near the host vehicle 100) 124 that is detected by the surrounding detection part 12. At this time, the control part 14 can make a determination result of whether the host vehicle 100 is able to cross the first road 110 to enter the specified area 126 only by focusing on the traffic situation of the second lane 124 and ignoring the traffic situation of the first lane 122. Thus, the processing burden of the control part 14 can be reduced.

At step S14, the control part 14 of the host vehicle 100 performs a moving control of left turn according to the determination result made at step S12. In other words, the disclosure utilizes the specified area 126 as a buffer area to make the host vehicle 100 move across the first road 120. When the traffic situation of the second lane 124 according to the surrounding status detected by the surrounding detection part 12 does not allow the host vehicle 100 to enter the specified area 126 from the second road (side road) 140, the host vehicle 100 is controlled to stop (on standby) in the second road 140. On the other hand, when the traffic situation of the second lane 124 according to the surrounding status detected by the surrounding detection part 12 allows the host vehicle 100 to enter the specified area 126 from the second road 140, the host vehicle 100 is controlled to cross the first road 110 to enter the specified area 126 from the second road 140 along the path 200*a*.

After the host vehicle 100 cross the first road 110 to enter the specified area 126, i.e., the yellow lane, the surrounding detection part 12 will detect a traffic situation of the first lane 122, i.e., the innermost lane or the target lane. Then, the control part 14 determines whether the host vehicle 100 is able to enter the first lane 122 only according to the detected traffic situation of the first lane 122. Then, the control part 14 performs a lane change to make the host vehicle 100 moves from the specified area 126 to enter the first lane (innermost lane) 122. Namely, after entering the specified area 126 of the first road 110, the host vehicle keeps in the specified area 126 for a while and detects the traffic situation of the first lane 122 until the traffic situation of the first lane 122 allows the host vehicle 100 to enter the first lane 122.

According to the above description, by using the specified area 126 (for example, the yellow lane), the movement of left turn is divided into two steps. First, the host vehicle 100 enters the specified area 126 first only according to the traffic situation of the second lane (innermost lane) 124. Then, the host vehicle 100 enters the first lane (innermost lane) 122 only according to the traffic situation of the first lane (innermost lane) 122.

Therefore, since at the beginning of the left turn the detection and determination related to the first lane (innermost lane) 122 are not required, the processing burden of the control part 14 can be effective reduced. Thus, the opportunity for making a successful left turn to enter the first lane 122 can be increased and the standby time of the host vehicle 100 for left turn can be also effectively reduced. Additionally, in comparison with determining the traffic situations of both lanes (the innermost and the outermost lanes) simultaneously, since the disclosure determines the traffic situation of only one lane before and after entering the specific area 126, the processing burden of the control part 14 can be effective reduced and the opportunity for making a successful left turn to enter the first lane 122 can be increased. Furthermore, in comparison with the control of direct entering the cross road form the side road, after the host vehicle 100 moves to the specified area 126, entering the first lane 122 can be performed by an easier moving control, i.e., the control of lane change according to the disclosure and thus the entire control process is less complex.

Next, the detail of the vehicle control method according to the disclosure is further described with reference to FIG. 4. For simplicity, the second lane 124, the specified area 126 and the first lane 122 of the road 120 are respectively referred to lanes A, B and C.

Figure 4:
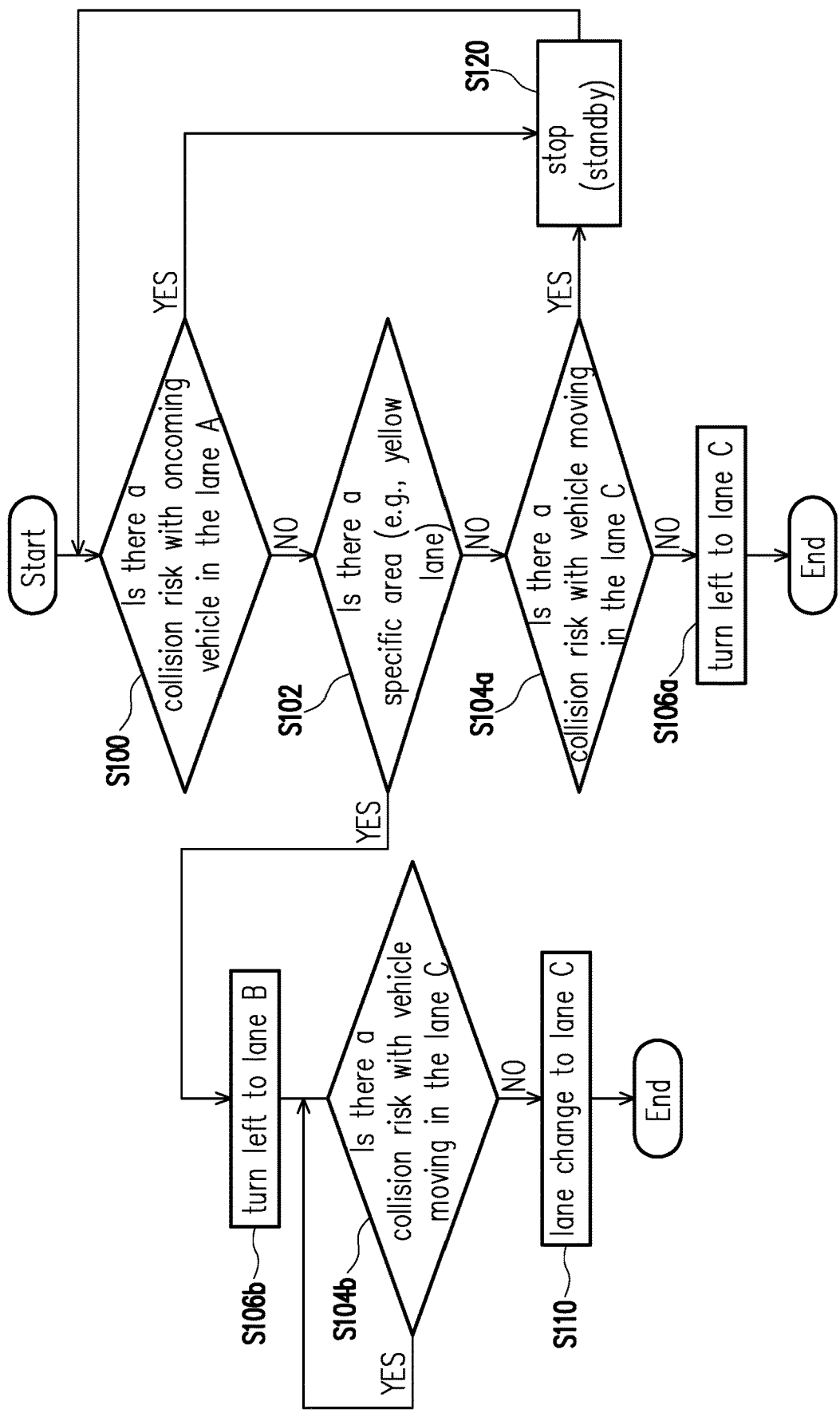
FIG. 4 shows a flow chart showing a detail vehicle control method according to the embodiment of the disclosure.

Referring to FIGS. 2 and 4, first, the host vehicle 100 stops in the side road 140 at the start point S and prepares to turn left to enter the lane C. At step S100, the control process first determines whether there is a collision risk with an oncoming other vehicle 106 moving in the lane A, i.e., confirms the traffic situation of the lane A. For example, the surrounding detection part 12 may detect a safety distance D1 between the other vehicle 106 and an intersection of the first road 120 and the second road 140, so as to determine whether there is enough safety distance D1 to make a left turn. When the detected distance between the vehicle 106 and the intersection is less than the safety distance D1, i.e., the control process determines that there is a collision risk in the lane A and is not safe at step S100 (YES, step S100), and then moves to step S120. The control part 14 make the host vehicle 100 stop (on standby) and the control process moves to step S100 again.

In addition, the safety distance D1 may be predetermined in the control part 14 or other suitable components. In addition, the safety distance D1 between the other vehicle 104 and the intersection is variable and depends on a speed that the other vehicle 104 moves in the lane A. Furthermore, in the case of the time to contact, it becomes the relative distance/the relative speed, so the speed of the other vehicle 104 has already been taken into consideration.

In addition, when the lane A is determined that there is no collision risk in the lane A at step S100 (NO, step S100), the control process moves to step S102 to determines whether there is the lane B 126, i.e., the yellow lane. At step S102, when the control process determines that the lane B 126 exists (YES, step S102), the control process moves to step S106b. Meanwhile, if there is no the lane B (NO, step S02), the control process moves to step S104a to determine the traffic situation of the lane C (target lane or the innermost lane).

At step S106b, the control process performs the moving control of left turn, so that the host vehicle 100 is controlled to turn left along the path 200a shown in FIG. 2 to enter the lane B, i.e., the yellow lane 126. Therefore, according to the disclosure and on the premise that the yellow lane exists, when the host vehicle 100 makes a left turn, the host vehicle 100 turns left to the lane B first only according to the traffic situation of the lane A without considering the traffic situation of the lane C.

After the host vehicle 100 turns left to the lane B, i.e., the yellow lane 126 at step S106b, the control process moves to step S104b and determines whether there is a collision risk with the other vehicle 104 moving in the lane C. If there is no collision risk in the lane C (NO, step S104b), the control process moves to step S110 and performs a moving control of lane change along the path 200b shown in FIG. 2 to enter the lane C. At this time, the entire left turn of the host vehicle 100 from the second road (side road) 140 to the first lane (innermost lane or target lane) 122 is completed. Alternatively, if there is collision risk in the lane C (YES, step S104b), the control process returns to step S104b and repeats the safety confirmation of the lane C.

In addition, at step S102, when the control process determines that the lane B 126 does not exist (NO, step S102), the control process moves to step S104a and determines whether there is a collision risk with the other vehicle 104 moving in the lane C. If there is no collision risk in the lane C (NO, step S104a), the control process moves to step S106a and performs a moving control of left turn to directly enter the lane C from the side road 140. In this situation, when the yellow lane 126 is not arranged between the first lane (innermost lane) 122 and the second lane (outermost lane) 124, the control part 14 have to consider the traffic situations of both the first lane 122 and the second lane 124. The host vehicle 100 can make a direct left turn from the second road 140 to the first lane 122 of the first road 110 only when both the first lane 122 and the second lane 124 have no collision risk with the host vehicle 100.

Furthermore, in the above description, the control process determines whether there is a collision risk in the lane A first, and then determines whether there is a yellow lane or not. However, the disclosure is not limited there to. Namely, the existence of the yellow lane can be checked before or after the determination of the collision risk of the lane A.

According to the aforementioned vehicle control method, when the host vehicle turns left or right to enter the target lane from the side road or a cross road, the host vehicle can enter the target lane by two steps of turning left to the specified area first only considering the traffic situation of the second lane and then making a lane change to first lane (target lane) only considering the traffic situation of the first lane. As a result, the standby time of the vehicle at the side road or the cross road can be effectively reduced.

In addition, since at the beginning of the left turn the detection and determination related to the first lane (innermost lane) 122 are not required, the control processing burden of the control part 14 can be effective reduced. Thus, the opportunity for making a successful left turn to enter the first lane 122 can be increased and the standby time of the host vehicle 100 for left turn can be also effectively reduced. Additionally, since the disclosure determines the traffic situation of only one lane before and after entering the specific area 126, the control processing burden of the control part 14 can be effective reduced and the opportunity for making a successful left turn to enter the first lane 122 can be increased. Furthermore, after the host vehicle 100 moves to the specified area 126, entering the first lane 122 can be performed by an easier moving control, i.e., the control of lane change and thus the entire control process is less complex.

Embodiment 2

Figure 5:
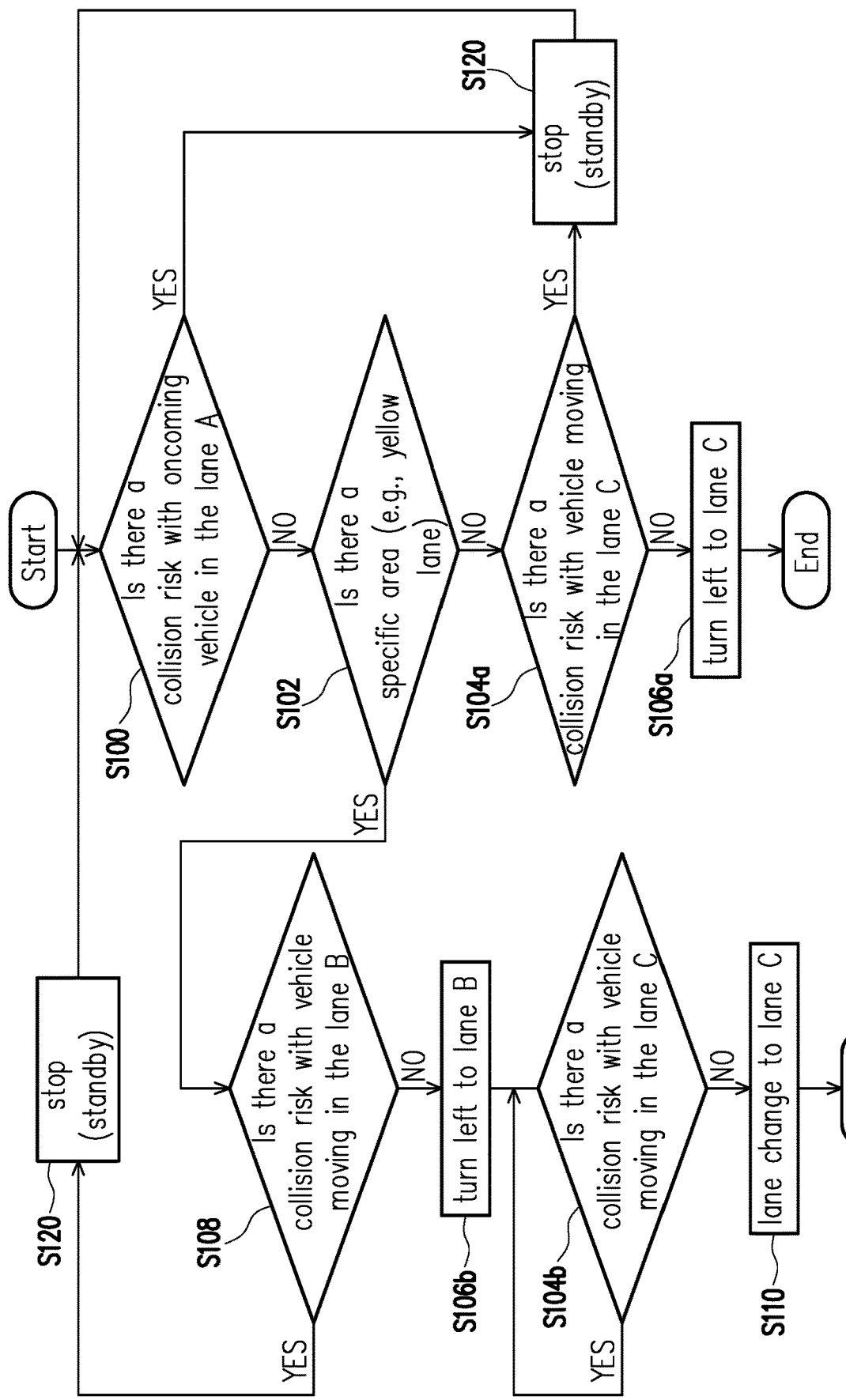
FIG. 5 shows a modified flow chart showing a detail vehicle control method according to the embodiment of the disclosure.

FIG. 5 shows a modified flow chart showing a vehicle control method according to the embodiment of the disclosure. In some cases, the traffic situation of the lane B is further considered to improve the safety confirmation, especially the traffic flow of the lane B cannot be ignored. As shown in FIG. 5, a step S108 is further included to determine whether there is a collision risk with the other vehicle moving in the lane B. Except the step S108, the other steps are the same as those described in the Embodiment 1, and thus their corresponding description is omitted.

At step S108, the control process detects the traffic situation of the lane B to determine the probability of a collision risk in the lane B. If the lane B is determined that there is no collision risk in the lane B (NO, step S108), the control process moves to step S106b to perform the moving control of left turn, so that the host vehicle 100 turn left from the side road 140 to enter the lane B of the first road 110. Therefore, according to the disclosure and on the premise that the lane B, i.e., the yellow lane exists, when the host vehicle 100 makes a left turn, the host vehicle 100 turns left to the lane B first only according to the traffic situations of the lane A (NO, steps S100 and S108) and the lane B without considering the traffic situation of the lane C.

In addition, if the lane B is determined that there is a collision risk in the lane B (YES, step S108), the control process moves to step S120 and the control part 14 makes the host vehicle stop at the side road 140. When there is a vehicle that moves in the lane B heading left or right side, the control process may determine that there is a collision risk with the vehicle moving in the lane B (yellow lane). Then, the control of left turn is suspended and the host vehicle 100 keeps waiting a suitable timing for turning left to enter the lane B.

According to the embodiment 2, in addition to the effects of the embodiment 1, by checking the collision risk in the lane B, the safety confirmation for the left turn from the side road 140 to the target lane can be further improved.

Others Configurations

According to the disclosure, following configurations are provided. A vehicle control apparatus is provided, and the apparatus comprises: a surrounding detection part, detecting a surrounding status of a host vehicle; and a control part, performing a moving control of the host vehicle according to the surrounding status. In a road system including a first road and a second road intersected with the first road that includes a first lane that is an innermost lane, a second lane that is an opposite lane of the first lane and a specified area arranged between the first and the second lanes, when the host vehicle enters a first lane, the control part make a determined result whether the host vehicle can enter the specified area or not according to a traffic situation of the second lane, and performs the moving control according to the determined result.

In the above configuration, after the host vehicle moves to the specified area, the control part determines whether the vehicle can enter the first lane or not according to a traffic situation of the first lane.

In the above configuration, after the host vehicle moves to the specified area, the control part performs a lane change to enter the first lane.

In the above configuration, the control part further determines whether the specified area is safe for entering. In this manner, the safety confirmation can be further increased.

In the above configuration, the specified area is a yellow line.

According to another configuration, a vehicle control method, executed by a control part of a host vehicle is provided, and the vehicle control method comprises: detecting a surrounding status of the host vehicle; performing a moving control of the host vehicle according to the surrounding status; in a road system including a first road and a second road intersected with the first road that includes a first lane that is an innermost lane, a second lane that is an opposite lane of the first lane and a specified area arranged between the first and the second lanes, when the host vehicle enters a first lane, making a determined result whether the host vehicle is able to enter the specified area or not according to a traffic situation of the second lane; and performing the moving control according to the determined result.

In the above configuration, the vehicle control method further comprises: after the host vehicle moves to the specified area, determining whether the host vehicle is able to enter the first lane or not according to a traffic situation of the first lane.

In the above configuration, the vehicle control method further comprises: after the host vehicle moves to the specified area, performing a lane change to make the host vehicle enter the first lane.

In the above vehicle control method, the method further determines whether the specified area is safe for entering. In this manner, the safety confirmation can be further increased.

In the above configuration, the specified area is a yellow line.

According to the above configuration, since at the beginning of the left turn the detection and determination related to the first lane (innermost lane) are not required, the processing burden of the control part can be effective reduced. Thus, the opportunity for making a successful left turn to enter the first lane can be increased and the standby time of the host vehicle for left turn can be also effectively reduced. Furthermore, after the host vehicle moves to the specified area, entering the first lane can be performed by an easier moving control, i.e., the control of lane change according to the disclosure and thus the entire control process is less complex.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle control apparatus, comprising:
   a surrounding detection part, detecting a surrounding status of a host vehicle; and
   a control part, performing a moving control of the host vehicle according to the surrounding status,
   wherein in a road system including a first road and a second road intersected with the first road that includes a first lane that is an innermost lane, a second lane that is an opposite lane of the first lane and a specified lane arranged between the first and the second lanes, in response to the host vehicle designating the first lane as a target lane, the control part makes a determined result whether the host vehicle can enter the specified lane or not only according to a traffic situation of the second lane, and performs the moving control according to the determined result.

2. The vehicle control apparatus according to claim 1, wherein after the vehicle moves to the specified lane, the control part determines whether the vehicle can enter the first lane or not only according to a traffic situation of the first lane.

3. The vehicle control apparatus according to claim 1, wherein after the vehicle moves to the specified lane, the control part performs a lane change to enter the first lane.

4. The vehicle control apparatus according to claim 1, wherein the control part determines whether the specified lane is safe for entering.

5. The vehicle control apparatus according to claim 1, wherein the specified lane is a yellow lane.

6. A vehicle control method, executed by a control part of a host vehicle, the method comprising:
   detecting a surrounding status of the host vehicle;
   performing a moving control of the host vehicle according to the surrounding status;
   in a road system including a first road and a second road intersected with the first road that includes a first lane that is an innermost lane, a second lane that is an opposite lane of the first lane and a specified lane arranged between the first and the second lanes, in response to the host vehicle designating the first lane as a target lane, making a determined result whether the host vehicle is able to enter the specified lane or not only according to a traffic situation of the second lane; and
   performing the moving control according to the determined result.

7. The vehicle control method according to claim 6, further comprising:
   after the host vehicle moves to the specified lane, determining whether the host vehicle is able to enter the first lane or not only according to a traffic situation of the first lane.

8. The vehicle control method according to claim 6, further comprising:
   after the host vehicle moves to the specified lane, performing a lane change to make the host vehicle enter the first lane.

9. The vehicle control method according to claim 6, further comprising: determining whether the specified lane is safe for entering.

10. The vehicle control method according to claim 6, wherein the specified lane is a yellow lane.

* * * * *